April 21, 1959   S. C. ROCKAFELLOW   2,883,579
TIMER FOR HIGH SPEED RESISTANCE WELDING OPERATIONS
Filed March 9, 1956   2 Sheets-Sheet 1

INVENTOR.
STUART C. ROCKAFELLOW
BY
Woodhams, Blanchard and Flynn
ATTORNEYS

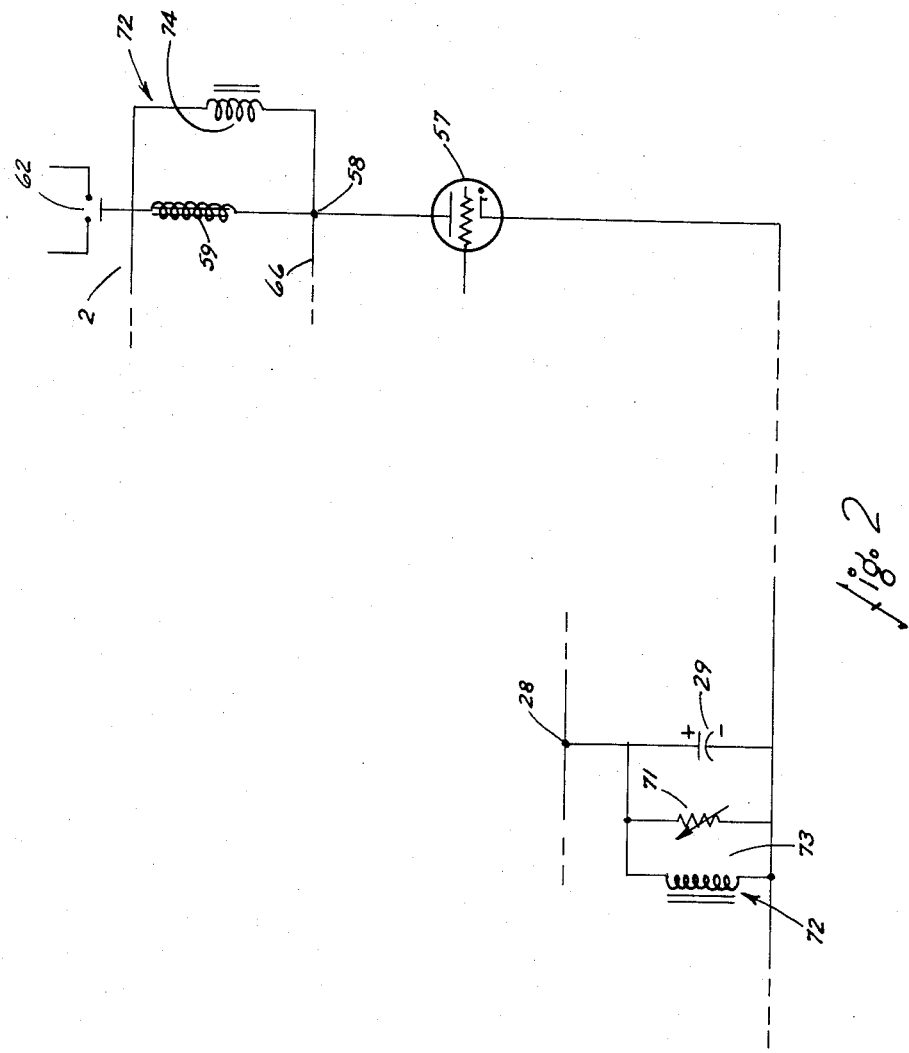

United States Patent Office 2,883,579
Patented Apr. 21, 1959

2,883,579
TIMER FOR HIGH SPEED RESISTANCE WELDING OPERATIONS

Stuart C. Rockafellow, Plymouth, Mich., assignor to Robotron Corporation, Detroit, Mich., a corporation of Michigan Application March 9, 1956, Serial No. 570,447

10 Claims. (Cl. 315—84.5)

This invention relates to a sequence control circuit for a high speed welding machine, particularly a welding machine of the gun type adapted for high speed operations, such as, for example, a welding sequence having only a two or three cycle hold time and a similar off time.

In high speed welding operations, small increments of time in each welding sequence will, if saved, provide very substantial total amounts of time saved over the course of even a single day of continuous operation. Thus, in a continual effort to improve the speed and accuracy of welding operations, the art has met with a problem caused by the time required for the welding electrodes to move under mechanically hydraulic urging, in response to the closing of the appropriate relay. Thus, after the so-called "squeeze" relay closes, a definite amount of time is required for the pressure fluid to move into the actuating cylinder and for the electrodes to move in response to the entry of pressure fluid into the actuating cylinder. Similarly, a time lag between electronic actuation of the mechanism and initiation of movement of the electrodes occurs after the welding operation is completed because of the slowness of response of the mechanical means to said electronic actuation. Thus, this mechanical lag becomes an apparently irreducible minimum beyond which the speed of operation of the total sequence cannot be reduced.

It has been previously suggested to increase the speed of operation by actuating the relay for moving the electrodes toward or away from the work to be welded, at a point in time ahead of that at which they are actually intended to either engage or release the work, but thus far, insofar as I am aware, all circuits for this purpose have been undesirably complex or, as a corollary of such complexity, they have been subject to erratic operation and/or frequent breakdown.

The time by which the flow of energy causing opening of the welding electrodes anticipates the termination of the flow of welding current is often in the art called "negative hold time" and, similarly, the time during which the initiation of such opening follows the termination of flow of welding current is called "positive hold time."

With the most rapidly operating guns now in use, of which I am aware, the minimum off time is not less than three cycles. The timer of the present invention has operated with off time as low as one cycle. Thus, it will be readily understood that by reducing said off time by approximately two-thirds, a very material amount of time can be saved during the course of even one day of continuous operation. Likewise, the hold time is conventionally at least three cycles, while the timer of the present invention operates with hold time as low as one cycle, or with no hold time at all.

Accordingly, a principal object of the invention has been to provide a welding sequencing circuit which is capable of providing an extremely short complete welding sequence.

A further object of the invention has been to provide a circuit, as aforesaid, operating in the same general manner as the more conventional circuits utilizing the four basic functions of "squeeze," "weld," "hold" and "off."

A further object of the invention has been to provide apparatus, as aforesaid, in which the initiation of the energy flow by which the welding electrodes are moved either toward or away from the work takes place sufficiently ahead of the time at which the actual movement is desired that compensation is made for the mechanical lag inherent therein and the movement takes place at the exact time desired within a high degree of accuracy.

A further object of the invention has been to provide apparatus, as aforesaid, wherein the welding electrodes are caused to open at precisely the moment that the welding current is terminated by initiating the flow of energy causing electrode opening at a sufficient time prior to the desired amount of opening to compensate for the mechanical lag in the mechanical portion of the equipment.

A further object of the invention has been to provide apparatus, as aforesaid, in which the amount of time by which the electrode opening energy is initiated ahead of the actual termination of the flow of welding current is controllable within a high degree of accuracy.

A further object of the invention has been to provide apparatus, as aforesaid, in which said control may be accurate within the limits of a single cycle.

A further object of the invention has been to provide apparatus, as aforesaid, in which the time of the initiation of electrode movement may be easily and readily adjusted.

A further object of the invention is to provide a circuit, as aforesaid, in which the flow of welding current through the work will be neither initiated nor extended by the failure of any tube or tubes.

Other objects and purposes of the invention will be apparent to persons acquainted with apparatus of this general sort upon reading of the following specification and inspection of the accompanying drawings.

In the drawings:

Figure 1 shows a circuit diagram of apparatus embodying the present invention.

Figure 2 fragmentarily shows a modification.

General description

In meeting the objects and purposes above set forth, there has been provided, in general, circuitry by which the hold time and the weld time timers are simultaneously energized and are simultaneously operable to independently time their respective functions, but with further means provided so that, regardless of the condition of the hold time timing circuit, the welding electrodes cannot open until after the welding current has actually ceased its flow.

Detailed description

Figure 1:
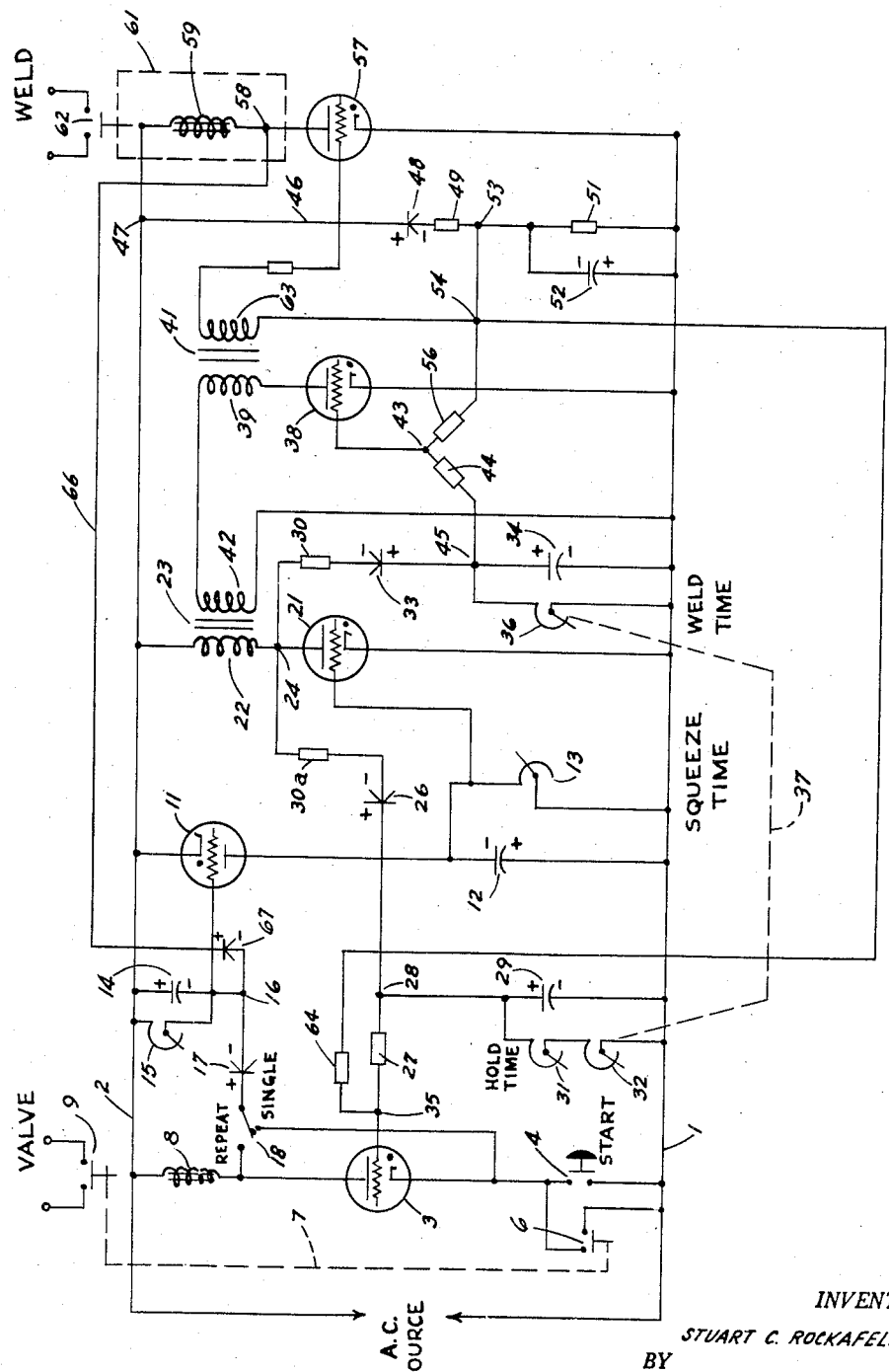

Referring now to the drawings in more detail, the embodiment therein illustrated is presented for the purpose of illustrating the invention. It will be recognized, however, that it is presented solely for illustrative purposes and no features of it should be considered limiting unless the context expressly so requires.

The bus conductors 1 and 2 are connectible to any suitable source of alternating current of the required potential. A first thyratron 3 has its cathode connected through a start switch 4 and the contacts 6 of a relay 7, whose winding appears at 8. The switch 4 has been shown as a manually operated switch, but it will be recognized that this may actually be any available type of switching device, including another electronic circuit. The anode of said first thyratron 3 is connected through the relay winding 8 to the bus conductor 2. The contacts 9 are also energized by the winding 8 of the relay 7 and are connected for controlling the solenoid whose operation results in the opening and closing of the welding electrodes.

The second thyratron 11 is connected between the bus conductors 1 and 2, its cathode being connected directly to the bus conductor 2 and its anode being connected through the capacitor 12 to the bus conductor 1. A circuit, including a variable resistance 13, is connected around the capacitor 12.

The grid of the second thyratron 11 is connected through the parallel connected capacitor 14 and variable resistance 15 to the bus conductor 2. Said grid is also connected to a junction point 16 and thence through a rectifier 17 to the armature of a switch 18. The contacts of said switch are connected respectively to the anode and to the cathode of the first thyratron 3. The sense of the rectifier 17 is such as to permit current travel from the bus conductor 2 to the switch 18, but to prevent the current travel in a reverse direction.

A third thyratron 21 is connected between the bus conductors 1 and 2, its cathode being connected directly to the bus conductor 1, and its anode being connected through the primary winding 22 of a transformer 23 to the bus conductor 2. A junction point 24, connected to the anode of the thyratron 21, is connected through a resistance 30a, thence through a rectifier 26 and a resistance 27 to the control electrode of the first thyratron 3. The sense of said rectifier 26 is such as to permit current travel from the bus conductor 2 toward the thyratron 3, but to prevent current travel in a reverse direction. A point 28 located between the rectifier 26 and the resistance 27 is connected through a capacitor 29 to the bus conductor 1. A pair of series connected, variable resistances 31 and 32 are connected around the capacitor 29.

The junction point 24 is also connected through a resistance 30, thence through a rectifier 33, and through a capacitor 34, to the bus conductor 1. The sense of the rectifier 33 is such as to permit current travel from the bus conductor 2 toward the bus conductor 1, but to prevent current travel in a reverse direction. A variable resistance 36 is connected around the capacitor 34. Suitable means 37 are provided connecting the adjustable members of the variable resistances 32 and 36 for causing them to move simultaneously and in predetermined proportion with respect to each other.

The fourth thyratron 38 has its cathode connected directly to the bus conductor 1 and its anode is connected through the primary winding 39 of a transformer 41, and thence through the secondary winding 42 of the transformer 23 back to the bus conductor 1. Its grid is connected to a junction point 43 and thence through a suitable resistance 44 to a junction point 45 located between the rectifier 33 and the capacitor 34.

A conductor 46 extends from a junction point 47 on the bus conductor 2 to a rectifier 48, and further conductors then connect said rectifier through serially connected resistances 49 and 51 to the bus conductor 1. A capacitor 52 is connected around the resistance 51. The sense of rectifier 48 is such as to permit current travel from bus conductor 2 toward the bus conductor 1, but to prevent current travel in a reverse direction. A junction point 53, located between the resistances 49 and 51, is connected through a junction point 54, whose purpose will appear hereinafter, and a resistance 56 to the junction point 43.

The value of the resistance 51 is sufficiently less than the maximum value of the pair of variable resistances 31 and 32 and of the variable resistance 36 that the potential drop between its ends will be materially less than the potential drop across said variable resistances. For example, the potential drop across the terminals of the resistance 51 is, in one embodiment of the invention, of the order of 20 volts, whereas the potential drop across the pair of resistances 31 and 32, or across the resistance 36, is of the order of 100 volts.

A fifth thyratron 57 has its cathode connected directly to the bus conductor 1 and its anode connected through a junction point 58, and thence through the winding 59 of a relay 61, to the bus conductor 2. The winding 59 controls the contacts 62 of said relay in a conventional manner, and said contacts are connected for energizing and de-energizing a welding current circuit.

The grid of said fifth thyratron 57 is connected through the secondary winding 63 of the transformer 41, thence to the junction point 54, and from there through a resistance 64 to the grid of the first thyratron 3.

The junction point 58 is connected by the conductor 66 through a rectifier 67 to the junction point 16, the sense of said rectifier being such as to permit the flow of current from the junction point 16 toward the junction point 58, but to oppose current flow in the reverse direction.

In all of the thyratrons used in the illustrated circuit, the shield grids are tied to the cathodes and, accordingly, are not shown.

Whereas mechanical relays have been herein shown as the devices responding to suitable energization for the closing of the circuits indicated at the contacts 6, 9 and 62, it will be appreciated that many other types of circuit closing devices, including fully electronic devices, may also be utilized and, hence, this feature of the illustrated circuit is particularly referred to as being illustrative only and not limiting.

The resistors 30 and 30a are of such value that in an "at rest" condition, only a few milliamperes of current pass through them to charge the capacitors 29 and 34, but such current passage is not sufficient to have any noticeable effect on the fourth thyratron 38.

The resistances 27, 64, 44 and 56 are all of relatively high value, such as three megohms.

*Operation*

The operation of the above described apparatus will be readily understood by first describing an "at rest" condition of the equipment, and then describing a typical operating cycle.

In the "at rest" condition, the first thyratron 3 is non-conductive, due to its open cathode circuit. The second thyratron 11 is conductive and charges the capacitor 12. The third thyratron 21 is held non-conductive by the negative charge on its grid originating from the charging of the capacitor 12. The fourth thyratron 38 is non-conductive due to the lack of an anode potential, the anode being connected through the secondary winding 42 of the transformer 23 back to the same bus conductor as that to which its cathode is connected, said transformer 23 being de-energized. Current is passing from the bus conductor 1 through the resistance 51 and the rectifier 48 to the bus conductor 2, thereby charging the capacitor 52, with a negative charge appearing on the side adjacent to the junction point 53.

The fifth thyratron 57 is held non-conductive by the negative charge on its grid originating in the capacitor 52 and being conducted through the junction point 53 to the junction point 54 and thence through the secondary winding of the transformer 41.

Current is also passing through the primary winding 22 of the transformer 23, thence through the rectifier 26 and the resistances 31 and 32 to the bus conductor 1, whereby to charge capacitor 29 with its positive charged side connected to the junction point 28. Similarly, current is also passing through said winding 22 through the rectifier 33 and a variable resistance 36 to the bus conductor 1, thereby charging the capacitor 34 with its positively charged side being that side connected to the junction point 45.

The capacitor 14 is de-energized, inasmuch as the junction point 16 to which it is connected has no connection to the bus conductor 1, either through the switch 18 due to the open contacts of switch 4 or the contacts 6, or through the conductor 66 due to the non-conductivity of the fifth thyratron 57.

The positive charge on the capacitor 34 is sufficient to overcome the negative charge on the capacitor 52 at the junction point 43 and thereby hold the grid of the fourth thyratron 38 in a condition permitting conductivity as soon as an anode potential is available.

The current passing through the primary winding 22 in the "at rest" condition is not sufficient to energize the transformer 23 sufficiently to provide an anode potential for the fourth thyratron 38.

Considering first the single condition, the armature of the switch 18 will be placed in the single position, as indicated, and the starting switch 4 will be closed. This closes the cathode circuit of the first thyratron 3 and permits flow of current therethrough. This energizes the winding 8 of the relay 7 and closes the contacts 6, and also closes the contacts 9. By the closing of the contacts 6, the circuit is locked into energized condition, and by closing the contacts 9, the welding electrodes are started toward their clamping position.

The closing of the contacts 4 also permits the flow of current to take place from the bus conductor 2 through the variable resistance 15 and the rectifier 17, thereby charging the capacitor 14, its negative side being that connected to the grid of the second thyratron 11. As soon as the capacitor 14 becomes charged, conduction through the second thyratron 11 is blocked and this terminates the charging of the capacitor 12. Said capacitor 12 now starts draining through the variable resistance 13 to determine the "squeeze" time. As soon as the capacitor 12 has drained sufficiently to permit the potential on the grid of the thyratron 21 to rise sufficiently to permit conduction thereof, such conduction will start with the results that: (1) a substantial short circuit is provided between the junction point 24 and the bus conductor 1, thereby the charging of both the capacitor 29 and the capacitor 34 is terminated, and (2) the transformer 23 is energized at a level sufficient to provide an anode potential for the fourth thyratron 38 and, since its grid is already positive, conduction therethrough is immediately established. Conduction through the fourth thyratron 38 energizes the transformer 41 and provides a positive potential on the grid control electrode of thyratron 57 sufficient to overcome the negative potential supplied by the capacitor 52. Thus, conduction through the third thyratron immediately results in conduction of the fifth thyratron 57, and thereby the closing of the contacts 62 and the starting of the flow of welding current.

The termination of the charging potential on the capacitor 34 will permit this capacitor to drain through the variable resistance 36, but the charge on the capacitor 52 remains at a constant level. Thus, within a period of time determined by the setting of the variable resistor 36, the positive charge on the capacitor 34 will diminish sufficiently to permit the negative charge on the capacitor 52 to dominate at the junction point 43 and, consequently, at the grid of the fourth thyratron 38. This will terminate conduction of said fourth thyratron and thereby terminate the application of positive pulses on the grid of the fifth thyratron 57. This terminates flow of current through the relay 61 and results in opening of the contacts 62 and the termination of the welding current.

Similarly, conduction through the tube 21 terminates the charging of the capacitor 29, and this accordingly starts to drain through the serially connected variable resistances 31 and 32. Considering first the more conventional situation, where a positive hold time is provided, that is, where the capacitor 29 diminishes to its critical level at some time after the termination of the welding current, this will, at a time determined by the values of the variable resistances 31 and 32, permit the negative potential applied to the junction point 35 from the capacitor 52 to dominate over the positive potential applied to the junction point 35 by the capacitor 29, and thereby block conduction of the first thyratron 3. When said thyratron 3 is blocked, the relay 7 becomes de-energized and the contacts 9 open. This causes an opening of the welding electrodes in the usual manner and the work may be removed.

De-energizing of the thyratron 3 terminates the charging of the capacitor 14 and it commences draining through the variable resistance 15. When it has drained sufficiently to permit the potential on the grid of the second thyratron 11 to rise sufficiently to permit conduction of said thyratron, the capacitor 12 will again become charged and the third thyratron 21 will be blocked. This returns the entire system to its "at rest" condition.

Assuming now that a negative hold time is to be utilized, that is, that the capacitor 29 drains out prior to the corresponding draining of the capacitor 34, the resulting operation will be analyzed as follows: When the positive potential provided from the capacitor 29 and applied to the junction point 35 diminishes sufficiently to enable the negative potential supplied by the capacitor 52 to dominate, the first thyratron 3 will be blocked in the same manner as above described, and the contacts 9 will be permitted to open. However, in this situation, the welding current is still being caused to flow, inasmuch as the capacitor 34 has not yet drained out sufficiently to render the fifth thyratron 57 de-energized in the manner set forth above. Thus, current is still flowing from the bus conductor 2 through the variable resistor 15 to the junction point 16, and thence through rectifier 67 and the conductor 66 of the junction point 58, and thence through the fifth thyratron 57 to the first bus conductor 1. This keeps the capacitor 14 charged and holds the second thyratron 11 blocked. So long as the second thyratron 11 remains blocked, the capacitor 12 will not re-charge and the third thyratron 21 remains conductive, thus preventing the re-charging of the capacitors 29 and 34.

This enables the mechanical elements actuated by the closing of the contacts 9 to function in response thereto, so that they will be ready to move the electrodes away from the work by the time the welding current is terminated by the timing out of the capacitor 34. Normally, this leading of the capacitor 34 by the capacitor 29 will seldom be more than one or two cycles, but it will obviously depend upon the mechanical lag between the closing of the contacts 9 and the actual commencement of movement of the welding electrodes.

As soon as the capacitor 34 times out, the welding current ceases to flow and the capacitor 14 starts to discharge in the manner described above. This, likewise, in the same manner as described above, determines the off time, after which the second thyratron 11 is rendered conductive, the capacitor 12 re-charged, thereby blocking conduction of the third thyratron 21, and thereby permitting the entire system to resume its "at rest" condition.

Where continuous operation is desired, the armature of the switch 18 will be placed in the "repeat" position and the manually controllable switch 4 will be held down continuously. Thus, for continuous operation, as soon as the apparatus returns to its "at rest" condition, the sequence above described as beginning with the closing of the switch 4 will again commence.

While the variable resistances 31 and 32 may be combined into a single resistance, independently controllable with respect to the variable resistance 36, it is more convenient for operating purposes to separate the resistances 31 and 32 into two serially connected units, as shown. The second variable resistance 32 is then preferably ganged with the variable resistor 36 and the two are so related to each other that, with the resistor 31 in its shorted, or at least its minimum, position, the resistor 32 will always bear a predetermined relationship with the resistor 36. Thus, any desired setting of the resistor 36 will automatically set the resistor 32 in such a condition that a given amount of negative hold time, such as two cycles, will be provided.

The portion of the circuit herein used for illustrative purposes, including and located between the third thyratron 21 and the fifth thyratron 57, is substantially similar to the corresponding portion of the circuit constituting the subject matter of my co-pending application Serial No. 283,433, and reference is accordingly made thereto for a more complete disclosure of this portion of said circuit, its operating characteristics and its several advantages. By the same token, it will be appreciated that other types of firing circuits may be utilized with the remainder of the circuit herein illustrated, providing only that such substitute circuit utilizes a capacitor and resistor corresponding to the capacitor 34 and the resistor 36, and utilizes a capacitor similar to the capacitor 52 and is capable of providing a connection for the conductor 66.

Figure 2 shows fragmentarily a circuit diagram for a modification wherein a positive hold time may be obtained without the necessity of the close adjustment of resistors required in the embodiment shown in Figure 1, where such is desired along with the other advantages provided by the embodiment shown in Figure 1, including the fail-safe features present therein.

In this embodiment, the series connected resistors 31 and 32 are replaced by a single variable resistor 71. The secondary winding 73 of a transformer 72 is connected in shunt around the capacitor 29. The primary winding 74 of said transformer is connected in the anode circuit of the thyratron 57, such as being connected in shunt around the winding 59. Thus, so long as the thyratron 57 is conducting, which means so long as the welding current is flowing, a charging potential is maintained on the capacitor 29. However, as soon as the thyratron 57 becomes non-conductive, the charging potential is removed from the capacitor 29 and the discharging thereof through the resistor 71 commences. This diminishes the positive potential applied to the junction point 28 by the capacitor 29 at a predetermined rate and brings about the same results that the discharging of the capacitor 29 brings about in the embodiment shown in Figure 1.

These and other modifications from the embodiment herein, particularly chosen for illustrative purposes, will be apparent to persons acquainted with apparatus of this general sort and, accordingly, the claims hereinafter appended are to be interpreted as covering such modifications, excepting as said claims by their own terms expressly required otherwise.

I claim:

1. In a sequence timing circuit, the combination comprising: a source of alternating potential; a first electric discharge device, having an anode, a cathode and a control electrode; a load and means connecting said anode through said load to one side of said source; means connecting said cathode to the other side of said source; a control circuit, including a second electric discharge device, for supplying positive potential to the control electrode of said first electric discharge device, said second electric discharge device having an anode and a cathode, connected to the respective sides of said source, and a control electrode; a capacitor and a resistance shunting said capacitor; means for charging said capacitor so that one side thereof is positive and the other side thereof is negative means connecting the positive side of said capacitor to the control electrode of said second electric discharge device; means for supplying a negative potential to the control electrodes of said first and second electric discharge devices; and means for causing said capacitor to commence to discharge in timed relation to the supply of positive potential to the control electrode of said first electric discharge device, whereby said second electric discharge device will be rendered non-conductive a predetermined time after positive potential is supplied to the control electrode of said first electric discharge device.

2. In a sequence timing device, the combination comprising: a load; a source of alternating potential; a first thyratron having an anode, a cathode and control electrode means; means connecting the anode of said first thyratron through said load to one side of said source and means connecting the cathode of said first thyratron to the other side of said source; a constant potential source having a positive and a negative terminal; means connecting said negative terminal to the control electrode means of said first thyratron whereby said first thyratron is normally maintained non-conductive; a control circuit for supplying positive potential to the control electrode means of said first thyratron for rendering same conductive, said control circuit including a second thyratron having an anode, a cathode and control electrode means; a capacitor and resistance means shunting said capacitor; circuitry connected for charging said capacitor so that one side thereof is positive and the other side thereof is negative; means connecting the positive side of said capacitor to the control electrode means of said second thyratron; means connecting the negative terminal of said constant potential source to the control electrode means of said second thyratron whereby a constant negative potential is applied thereto; said capacitor, when fully charged, imposing a positive potential on the control electrode means of said second thyratron sufficient to permit conduction thereof; and means for causing said capacitor to commence to discharge at a point in time no later than the initiation of conduction of said first thyratron so that said second thyratron becomes non-conductive at a predetermined time with respect to the initiation of conduction of said first thyratron.

3. A combination of claim 2 wherein said control circuit includes a series of sequence timing components between said second thyratron and said first thyratron, said first thyratron being the ultimate component to the controlled and said second thyratron being the initiating component of the sequence timing components.

4. In a sequence timing device, the combination comprising: a load; a source of alternating current; a first thyratron having an anode, a cathode and control electrode means; means connecting the anode of said first thyratron through said load to one side of said alternating source and means connecting the cathode of said first thyratron to the other side of said source; a first constant potential source having a positive and a negative terminal, the negative terminal of said first constant potential source being connected to the control electrode means of said first thyratron whereby said first thyratron is normally maintained non-conductive; a control circuit for supplying positive potential to said control electrode means of said first thyratron, said control circuit including a second and third thyratron, each thereof having an anode, a cathode and control electrode means; means for initiating conduction of said third thyratron a predetermined length of time after initiation of conduction of said second thyratron, initiation of conduction of said third thyratron effecting the initiation of conduction of said first thyratron by supplying a positive potential to the control electrode means of said first thyratron; a capacitor and a first variable resistance shunting said capacitor; means, including a rectifier, connecting one side of said capacitor to one side of said alternating source in the anode circuit of said third thyratron and means connecting the other side of said capacitor to the other side of said alternating source so that said one side is positive and said other side thereof is negative; means connecting the positive side of said capacitor to the control electrode means of said second thyratron; a second constant potential source having a positive and a negative terminal, means connecting the negative terminal of said second positive potential source to the control electrode means of said second thyratron whereby a constant negative potential is applied thereto; said capacitor, when fully charged, imposing a positive potential on the control electrode means of said second thyratron sufficient to permit conduction thereof, and means for causing said capacitor to commence to discharge at a point in time no later than the initiation of conduction of said first thyratron so that said second thyratron becomes non-conductive at a predetermined time with respect to the initiation of conduction of said first thyratron.

5. The combination of claim 4 including a fourth thyratron having an anode, a cathode and control electrode means and means connecting said fourth thyratron in circuit between said third thyratron and said first thyratron, said fourth thyratron controlling conduction of positive potential to the control electrode means of said first thyratron; a third constant potential source having a positive and negative terminal and means connecting the terminal of said third constant potential source to the control electrode means of said fourth thyratron; a second capacitor and circuitry means connecting one side of said second capacitor to the control electrode means of said fourth thyratron and, through a rectifier, to one side of said alternating source in the anode circuit of said third thyratron, and means connecting the other side of said capacitor to the other side of said alternating source whereby said one side of said capacitor is positive and the other side is negative; a second variable resistance shunting said second capacitor, said second capacitor, when fully charged, imposing a positive potential on the control electrode means of said fourth thyratron sufficient to permit conduction thereof.

6. A combination of claim 5 wherein said first, second and third constant potential sources consist of a single capacitor whose respective sides are connected to the respective sides of said alternating source and means including a unidirectional current conducting means connected between one side of said capacitor and one side of said source so that when said capacitor is charged, one side thereof will be positive and the other will be negative.

7. A combination of claim 6 wherein said first and second variable resistances are connected together for simultaneous adjustment.

8. In a sequence timing device, the combination comprising: a load; a source of alternating current; a first thyratron having an anode, a cathode and control electrode means, means connecting the anode of said first thyratron through said load to one side of said alternating source and means connecting the cathode of said first thyratron to the other side of said alternating source; a first constant potential source having a positive and negative terminal, means connecting the negative terminal of said first constant potential source to the control electrode means of said first thyratron; a control circuit for supplying positive potential to the control electrode means of said first thyratron, said control circuit including second and third thyratrons, the initiation of conduction of said third thyratron effecting the initiation of conduction of said first thyratron by supplying a positive potential to the control electrode means of said first thyratron, said second and third thyratrons each having an anode, a cathode and control electrode means; a fourth thyratron having an anode, a cathode and control electrode means, means connecting the cathode of said fourth thyratron to said one side of said alternating source; a capacitor having one of its sides connected to the other side of said alternating source and having the other of its sides connected to the anode of said fourth thyratron and to the control electrode means of said third thyratron; a resistor shunting said first capacitor; a junction point connected to the control electrode means of said fourth thyratron; means, including a first rectifier, connecting said junction point to circuitry, including said second thyratron, such that a negative potential is applied to the control electrode means of said fourth thyratron and conduction of said fourth thyratron is blocked when said second thyratron is conducting; means, including a second rectifier, connecting said junction point to the anode of said first thyratron; a second capacitor having one of its sides connected to said one side of said source and having the other side connected to said junction point; a resistor shunting said second capacitor.

9. The combination of claim 8, including: a third capacitor and means connecting one side thereof to the other side of said source and means connecting the other side thereof to the control electrode means of said second thyratron and means including a rectifier, connecting said other side of said capacitor to said one side of said alternating source in the anode circuit of said third thyratron whereby said other side of said capacitor is charged positive; a variable resistance shunting said third capacitor; a second constant potential source having a positive and a negative terminal, means connecting the negative terminal of said second constant potential source to the control electrode means of said second thyratron, said third capacitor, when fully charged, imposing a positive potential on the control electrode means of said second thyratron sufficient to permit conduction thereof.

10. The combination of claim 9 including: a fifth thyratron in circuit between said third thyratron and said first thyratron, said fifth thyratron controlling conduction of positive potential to the control electrode means of said first thyratron, said fifth thyratron having an anode, a cathode and control electrode means; a third constant potential source having a positive and a negative terminal and means connecting the negative terminal of said third constant potential source of the control electrode means of said fifth thyratron; a fourth capacitor and means connecting one side thereof to the other side of said alternating source and means, including a rectifier, connecting the other side of said capacitor to said one side of said alternating source, in the anode circuit of said third thyratron; a second variable resistance shunting said fourth capacitor, said fourth capacitor, when fully charged, imposing a positive potential on the control electrode means of said fifth thyratron sufficient to permit conduction thereof.

References Cited in the file of this patent
UNITED STATES PATENTS

| 2,583,102 | Holden | Jan. 22, 1952 |
| 2,623,108 | Holden | Dec. 23, 1952 |
| 2,639,361 | Hartwig et al. | May 19, 1953 |
| 2,651,006 | Mederos | Sept. 1, 1953 |